(12) United States Patent
Irwin et al.

(10) Patent No.: US 7,638,155 B2
(45) Date of Patent: *Dec. 29, 2009

(54) PROCESS FOR MAKING SOY PROTEIN PRODUCTS HAVING REDUCED OFF-FLAVOR

(75) Inventors: Anthony Irwin, St. Louis, MO (US); Navpreet Singh, St. Louis, MO (US); Leo Kelly, Chesterfield, MO (US)

(73) Assignee: Solae, LLC, St. Louis, MO (US)

( * ) Notice: Subject to any disclaimer, the term of this patent is extended or adjusted under 35 U.S.C. 154(b) by 268 days.

This patent is subject to a terminal disclaimer.

(21) Appl. No.: 11/159,547

(22) Filed: Jun. 23, 2005

(65) Prior Publication Data

US 2006/0292284 A1 Dec. 28, 2006

(51) Int. Cl.
*A23L 1/20* (2006.01)
(52) U.S. Cl. .................................. 426/634; 426/656
(58) Field of Classification Search .............. 426/656, 426/634

See application file for complete search history.

(56) References Cited

U.S. PATENT DOCUMENTS

| | | | |
|---|---|---|---|
| 4,493,854 | A | 1/1985 | Friedrich et al. |
| 4,496,599 | A * | 1/1985 | Steinkraus .................. 426/430 |
| 5,858,449 | A | 1/1999 | Crank et al. |
| 2002/0102346 | A1 | 8/2002 | Stark et al. |
| 2004/0047972 | A1 | 3/2004 | Wasche et al. |

FOREIGN PATENT DOCUMENTS

WO    WO 02/39831    * 5/2002

OTHER PUBLICATIONS

Derwent Abstract for RU 2206233 published Jun. 20, 2003. Inventors: Dotsenko et al. Acc No. 2003-552872.*
Copending U.S. Appl. No. 11/966,387, filed Dec. 28, 2007.*
Copending U.S. Appl. No. 11/471,862, filed Jun. 21, 2006.*
Montanari L, et al, "Selective Extraction of Phospholipid Mixtures by Suercritical Carbon Dioxide and Cosolvents" Journal of Food Science, Institute of Food Technologists, Chicago, IL, Us, vol. 61, No. 6, 1996, pp. 1230-1233, 1253, XP002231212.
Montanari L, et al, "Selective Extraction of Phospholipids from Soybeans with Supercritical Carbon Dioxide and Ethanol" Journal of Supercritical Fluids, PRA Press, US, vol. 14, No. 2, Jan. 1, 1999, pp. 87-93, XP004262490.
Ronyai, et al., "Supercritical Fluid Extraction of Corn Germ with Carbon Dioxide-Ethyl alcohol Mixture" Journal of Supercritical Fluids, PRA Press, US, vol. 14, No. 1, Oct. 1, 1998, pp. 75-81, XP004262489.
Cocero MJ, et al, "Supercritical Fluid Extraction of Sunflower Seed Oil wit CO2-Ethanol Mixtures" Journal of the American Oil Chemists' Society, AOCS Press, Champaign, IL, US, vol. 73, No. 11, Nov. 1996, pp. 1573-1578, XP000637469.

* cited by examiner

*Primary Examiner*—Anthony Weier
(74) *Attorney, Agent, or Firm*—James L. Cordek; Holly M. Amjad

(57) ABSTRACT

Novel processes for the production of soy protein products, such as soy protein isolates and soy protein flour, having reduced off-flavors are disclosed. One process includes a three step process including extraction utilizing a mixture of supercritical carbon dioxide and an organic solvent. The soy protein isolates produced by the processes describe herein are suitable for use in numerous food products, including soymilk.

6 Claims, 2 Drawing Sheets

PROCESS FOR MAKING SOY PROTEIN PRODUCTS HAVING REDUCED OFF-FLAVOR

BACKGROUND OF THE INVENTION

The present invention generally relates to protein products, such as plant protein and specific animal protein having reduced off-flavor and processes for making these protein products with reduced off-flavor. In particular, the present invention relates to extraction processes for removing off-flavor precursors utilizing either supercritical carbon dioxide or supercritical carbon dioxide and an organic solvent in order to achieve the protein products with reduced off-flavor. The produced protein products are suitable for use in a number of food products.

In response to the results of recent research showing the negative effects of certain foods on health and nutrition, consumers are becoming more health conscious and monitoring their food intake more carefully. In particular, since animal products are the main dietary source of cholesterol and may contain high levels of saturated fats, health professionals have recommended that consumers significantly reduce their intake of red meats. As a substitute for red meats, many consumers are choosing non-red meat products such as plant protein products, dairy protein products and egg protein products.

It is well known that vegetable products, such as soy protein products, contain no cholesterol. For decades, nutritional studies have indicated that the inclusion of soy protein in the diet actually reduces serum cholesterol levels in people who are at risk. Further, the higher the cholesterol level, the more effective soy proteins are in lowering that level.

Despite all of the above advantages, it is well known that by supplementing foods with increased levels of dietary fiber and protein, taste can be seriously compromised. More particularly, protein sources, such as soy protein, can produce objectionable off-flavors in the finished products. For example, many consumers complain that high protein foods, like those supplemented with soy protein, taste grassy, beany, and bitter. Soy off-flavors may be responsible for most of the complaints with respect to the taste of soy-based products.

It is believed that the development of soy off-flavors is initiated when phospholipids and triglycerides undergo hydrolysis to yield polyunsaturated free fatty acids, which then react with molecular oxygen to form fatty acid hydroperoxides and other oxygenated lipid species. Both the hydrolysis and the oxidation can occur in enzyme-catalyzed and in non-enzyme-catalyzed reactions. The hydroperoxides then decompose into smaller molecules such as aldehydes and ketones and it is these small molecules that are responsible for the odor and flavor of vegetable oil-based products. In particular, Boatwright (U.S. Pat. No. 6,426,112), Boatwright et al., J. Food Sci. vol 66, page 1306 (2001), Boatwright et al., J. Food Sci. vol 65, page 819 (2000), Y. Feng, et al. (*Aroma Active Compounds in Food*, ACS Symposium Series 794, ed. G. R. Takeaka et al., page 251 (2001)), and A. Kobayashi et al. (J. Agric. Food Chem., vol. 43, page 2449 (1995)) have identified some of the most flavor active of these molecules in soy isolate and soymilk, which contribute to soy protein's unique flavor. Specifically, these molecules may include methanethiol, dimethyl trisulfide, 2-pentyl pyridine-(E,E) 2,4-nonadienal, (E,Z) 2,6-nonadienal, (E,E) 2,4-decadienal, (E,Z) 2,4 decadienal, acetophenone, hexanal, 1-octen-3-one, beta-damascenone, (E) 2-nonenal, (E) 4,5-epoxy-(E)-2-decenal, vanillin, maltol, 1-octen-3-ol, 2-pentyl furan, 2-heptanone, octanal, (E) 3-octen-2-one, 2-decanone, benzaldehyde, and 2,3-butanedione. Most of these flavor active volatiles are derived from oxidation of polyunsaturated lipids. The formation of these flavor molecules and their hydroperoxide precursors begins as soon as the bean is crushed and continues through the soy isolate manufacturing process. Traditional processing methods have not been completely successful in reducing the level of off-flavors and off-flavor precursors to an acceptable level in finished soy isolate or in foods to which it is added.

The conventional process for manufacturing soy protein isolate begins with the production of full fat flakes from soybeans, which are substantially defatted with hexane. This process typically removes more than 80% of the acid hydrolysable lipids in the flakes, as measured by AOAC Method 922.06, while leaving behind the majority of the phospholipids present. Soy protein is then extracted from the defatted flakes/flour with water and separated from the insoluble vegetable matter via centrifugation. The extracted protein is precipitated, washed, resuspended in water and spray dried as described, for example, in Hettiarachchy, et al., Soybeans: Chemistry, Technology, and Utilization, pp. 379-411, Aspen Publishers, (1997), which is incorporated herein by reference in its entirety.

These processes are unsuccessful in producing a soy protein with an acceptable flavor because the hexane is inefficient at removing all of the phospholipids and triglycerides that contain polyunsaturated fatty acids. Low levels of these off-flavor precursors, and some of the enzymes which act on them, remain after the hexane extraction. These components continue to generate off-flavors during the removal of hexane from the defatted flakes at elevated temperatures. The defatted flakes which serve as the source of the soy isolate thus typically contains about 2.8% to 5.0% of lipid (dry basis), which may be analyzed as acid hydrolysable fat, and about 1.0% phospholipids, which may be analyzed by conventional HPLC methods. It also contains appreciable quantities of the flavor-active volatiles that persist through the subsequent protein isolation steps to result in isolate with the familiar grassy and beany flavors. The extraction with hydrocarbon solvents, such as hexane, has the additional disadvantage of creating air pollution due to the inevitable leakage of solvent into the atmosphere.

As an alternative to traditional hexane extraction, food scientists have evaluated the use of supercritical carbon dioxide ($CO_2$) to remove the lipids and the off-flavor molecules from soy products. This process offers the advantage of a non-polluting solvent whose residues, because of its low boiling point, are much easier to remove from the defatted flakes. Two general approaches that utilize supercritical carbon dioxide to reduce off-flavors in soy products have been suggested. The first approach, as disclosed by Friedrich in U.S. Pat. No. 4,493,854, employed supercritical carbon dioxide to isolate the oil present in soybean. Friedrich also converted the defatted flakes into two isolate samples which were claimed to have improved flavor as compared to commercial isolate prepared from hexane-defatted flakes. While the grassy and beany flavors were removed from the two isolates, their overall flavor scores (6.0, 7.1) were only slightly improved compared with a range of commercial isolates referred to by Friedrich in K. Warner et al, Cereal Chem. 60:102 (1983), which had an average flavor score of 6.1. It is believed that better flavor scores were not obtained for the samples derived from the $CO_2$-extracted flours for several reasons. Firstly, very high temperatures (84-100° C.) were used during the extraction in order to maximize oil recovery, and these high temperatures may have induced off-flavor formation. Secondly, supercritical $CO_2$ is a poor solvent for phospholipids, and the high phospholipids levels present in the full fat flake would be little changed after extraction. Even though the extracting solvent was removed at lower temperatures than hexane, it is likely that the high residual levels of phospholipids regenerated the off-flavor volatiles that may have been removed during the extraction step. Other polar lipids, such as lipid hydroperoxides and other oxygenated lipid species may have low solubility in supercritical $CO_2$ and may remain to serve as sources of off-flavor aldehydes and ketones.

It may also be possible that $CO_2$ is simply not a strong enough solvent to remove the off-flavored aldehydes and ketones that are known to bind tightly to the soy protein.

An alternative approach to improve the flavor of soy protein isolate is to remove the off-flavor molecules by extracting them with supercritical solvent, such as supercritical $CO_2$, after the protein has been isolated from the flake. For example, P. Maheshwari, E. T. Ooi, and Z. L. Nikolov, J. Amer. Oil Chem. Soc., 72:1107 (1995) extracted soy isolate with supercritical $CO_2$, liquid $CO_2$, and a mixture of 95% supercritical $CO_2$/5% ethanol. Although the extracted isolates had a lower intensity of beany odor and improved overall acceptability compared with the starting isolate, each still retained significant flavor scores for beany odor. Thus, for the same reason outlined above, it is probable that high concentrations of phospholipids and oxygenated lipid species remain in the extracted isolates and cause the residual beany flavor.

While the prior art has demonstrated that supercritical $CO_2$ extraction may have an impact on the intensity of soy beany flavors, processes used to date have not been entirely satisfactory because they leave behind significant quantities of off-flavor precursors. These precursors quickly regenerate the beany off-flavors which a majority of consumers find to be unacceptable.

Many of the volatiles noted above that contribute to the flavor of fresh soy isolate gradually increase in concentration as the isolate ages during storage. This phenomenon increases the intensity of the off-flavor and makes the isolate less and less acceptable to consumers as it ages. Any process which decreases the rate at which these volatiles are formed will lead to an increase in the shelf life of the soy isolate.

Additionally, as a wet process conducted at benign temperatures and at pHs ranging from 4 to 9, soy isolate manufacturing is prone to microbial growth. Unless it is carefully controlled, the growth of these microorganisms in-process will lead to the production of off-flavors and pathogens. Accordingly, a zero tolerance of pathogenic organisms and a maximum acceptable level of total plate count are commonly specified for the defatted flakes/flour that are used as the raw material for the soy isolate process. The small but acceptable levels of non-pathogenic organisms usually present in the defatted flakes/flour inevitably lead to growth during the soy isolate manufacturing process. This growth is minimized by minimizing the time of exposure of the isolate to aqueous conditions during the process and by frequent cleaning of the manufacturing equipment. Both of these conditions restrict the flexibility of the manufacturing facility and increase the costs of its operation. Any process that lowered the total plate count on the incoming defatted flakes/flour would therefore improve the operating efficiency of the soy isolate process.

As is evident from the foregoing, a need exists in the industry for a defatted flakes/flour with a minimized microbiological load, for soy protein isolate having reduced off-flavors and a longer shelf life, and a process of making such a soy protein isolate. Additionally, it would be beneficial if the defatted flakes/flour have low levels of lipids. Further, it would be beneficial if this process could be versatile and work with different commercial soy starting materials.

SUMMARY OF THE INVENTION

The present invention provides processes for extracting off-flavors and off-flavor precursors from commercially available full fat proteins utilizing a supercritical $CO_2$ extraction process to produce a protein composition. In one embodiment for producing a defatted protein composition, the process includes a first extraction step utilizing supercritical $CO_2$ and a second extraction step utilizing a mixture of supercritical $CO_2$ and an organic solvent. The organic solvent in the second extraction is preferably ethanol, although other organic solvents are suitable. In another embodiment for producing a defatted protein composition, the process of the present invention includes a single extraction including utilizing a mixture of supercritical $CO_2$ with an organic solvent. In another embodiment for producing a defatted protein composition, the process includes an extraction step utilizing supercritical $CO_2$ in an extraction chamber at a pressure greater than 10,000 psi. The defatted protein composition is selected from the group consisting of flours, concentrates and isolates produced by any of the processes of the present invention and can be converted to protein isolates utilizing an extraction step including an aqueous wash solution, which can have a neutral or basic pH.

As such, the present invention is directed to a process for preparing a defatted protein composition having reduced off flavor. The process comprises a first extraction where lipids and water are extracted from a full fat protein composition using supercritical $CO_2$. After extraction with supercritical $CO_2$, a second extraction is completed where off-flavors and off-flavor precursors are extracted from the product of the first extraction using a mixture of supercritical $CO_2$ and an organic solvent.

The present invention is further directed to a process for preparing a defatted protein composition having reduced off flavor. The process comprises an extraction where lipids, off-flavors, and off-flavor precursors are extracted from a full fat soy protein composition using a mixture of supercritical $CO_2$ and an organic solvent.

The present invention is further directed to a process for preparing a defatted protein composition having reduced off-flavor. The process comprises an extraction where lipids, off-flavors, and off-flavor precursors are extracted from a full fat protein composition using supercritical $CO_2$ in an extraction chamber at a pressure of greater than 10,000 psi.

The present invention is further directed to a protein isolate comprising less than about 1.5% (by weight dry basis) fat (by acid hydrolysis).

The present invention is further directed to a protein flour comprising at least 50% (by weight dry basis) and less than 65% (by weight dry basis) protein and less than about 3% (by weight dry basis) fat (by acid hydrolysis).

The present invention is further directed to a flour comprising at least 50% (by weight dry basis) and less than 65% (by weight dry basis) protein and less than about 3% (by weight dry basis) fat (by acid hydrolysis) wherein the flour is prepared from a process including performing an extraction on a full fat protein composition with supercritical carbon dioxide to produce an extracted product.

The present invention is further directed to a flour comprising at least 50% (by weight dry basis) and less than 65% (by weight dry basis) protein and less than about 0.7% (by weight dry basis) fat (by petroleum ether extraction).

Other features and advantages of this invention will be in part apparent and in part pointed out hereinafter.

DETAILED DESCRIPTION OF THE PREFERRED EMBODIMENTS

Figure 1:
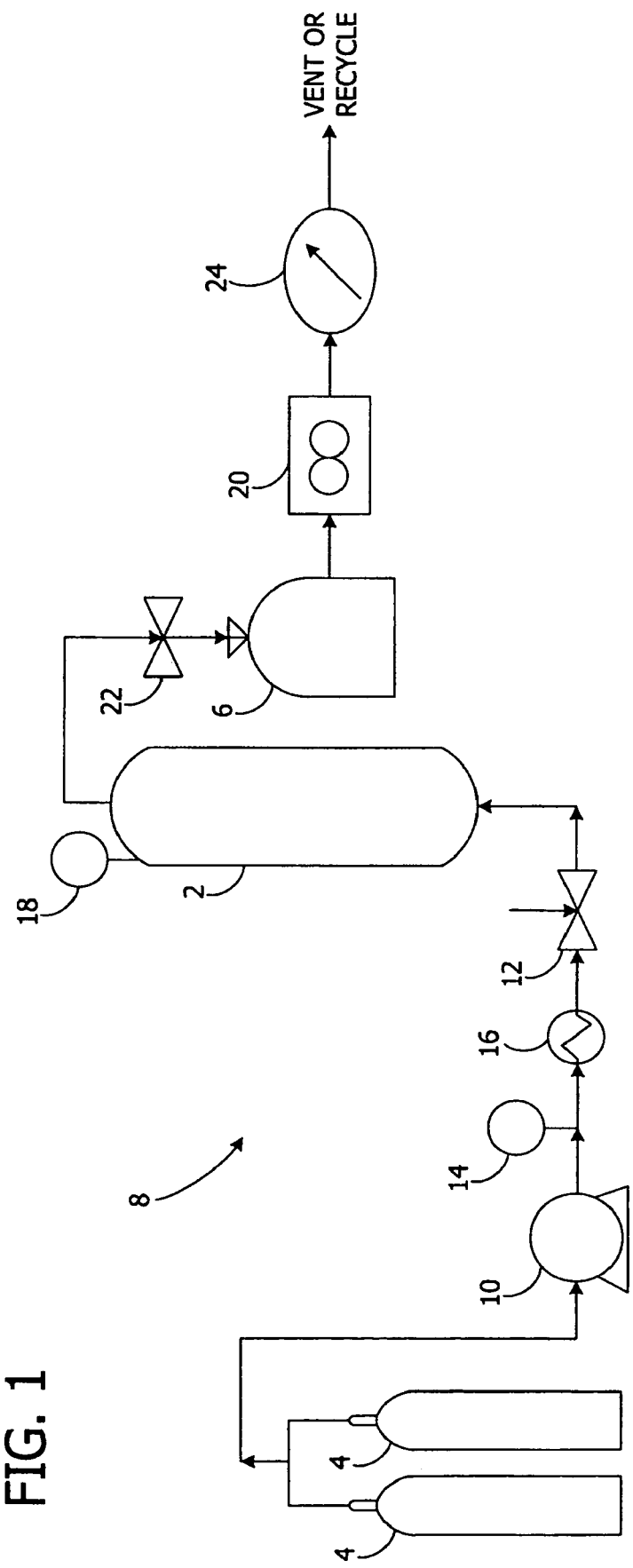
FIG. 1 is a representation of a supercritical carbon dioxide extraction system suitable for use in the processes described herein.

In the present invention, proteins are selected from the group consisting of plant protein, dairy protein, egg protein and mixtures thereof. Plant proteins are selected from the group consisting of soy protein, pea protein, lupin protein, wheat protein such as gluten, corn protein, rice protein and potato protein; dairy proteins are selected from the group consisting of skim milk powder, whole milk powder, casein, caseinate soluble proteins such as sodium caseinate and calcium caseinate, whey protein concentrate and whey protein isolate; and egg proteins are selected from the group consisting of egg white protein and egg yolk protein. A preferred protein is soy protein.

The present invention is generally directed to a soy protein composition with reduced off-flavors and reduced off-flavor precursors and processes for making the same. The process can produce soy protein isolates, soy protein concentrates, and/or soy protein flour. In one particular embodiment, the process for making a defatted soy protein flour with reduced off-flavor includes multiple extractions wherein one or more extraction includes the use of supercritical $CO_2$. Specifically, it has been discovered that extraction of full fat soy flour utilizing supercritical $CO_2$ and an organic solvent can be utilized to produce defatted soy protein flour with reduced off-flavors. As used herein the terms "soy protein isolate" and "soy isolate," used interchangeably, mean a soy protein material comprising 90% or greater (by weight dry basis) soy protein. As used herein, the term "soy protein concentrate" means a soy protein material comprising at least 65% (by weight dry basis) and less than 90% (by weight dry basis) soy protein. As used herein, the term "soy flour" means a soy protein material comprising at least 50% (by weight dry basis) and less than 65% (by weight dry basis) soy protein.

In one embodiment, the process for producing the defatted soy protein flour comprises two extraction steps and may be referred to as a sequential extraction process. The first step is an extraction of lipids and water from full fat soy flour using supercritical $CO_2$ and the second is an extraction of off-flavors and off-flavor precursors from the first extraction product using a mixture of supercritical $CO_2$ and an organic solvent. In a third, optional step, a soy protein isolate may be prepared from the defatted soy protein flour by using an aqueous wash solution, which may have a neutral or basic pH.

This process starts with full fat soy flour that is eventually converted into soy protein isolates. Full fat soy flour is conventionally prepared from whole soybeans generally by cracking, dehulling, conditioning, and flaking, and typically comprises about 20% (by weight dry basis) fat (by acid hydrolysis) and about 45% (by weight) protein. Typically, the soybeans are first aspirated and then cleaned of tramp metals by magnets. The soybeans are then fed into corrugated cracking rolls that crack each bean into four to eight pieces. The soybeans are then put through an aspirator again to remove the hulls, and are conditioned by being placed into either a stacked cooker and heated or into a rotary steam tube. Lastly, the cracked soybeans are flaked by putting them through cylindrical rolls that press them into smooth flakes, which are commonly referred to as full fat soy flakes. These flakes can be further ground to obtain a full fat soy flour.

In accordance with a sequential extraction process of the present invention, the full fat soy flour is subjected to a first extraction to extract lipids from full fat soy flour. This first extraction is done using supercritical $CO_2$. The lipids being extracted from the full fat soy flour typically include triglycerides and free fatty acids. About 80-100 wt % of the total wt % of soybean triglycerides are extracted from the full fat soy flour in the first extraction step. Generally, the phospholipids:protein ratio of the extracted flour in the first extraction step is about 0.017:1, which is little different from that of a typical flake (about 0.018:1).

The first extraction of lipids from full fat soy flour using supercritical $CO_2$ is carried out in a supercritical fluid extraction system. As shown in FIG. 1, a suitable supercritical fluid extraction system (8) comprises an extractor (2), a solvent reservoir (4), and a separator (6). The full fat soy flour is placed in the extractor (2), and the system (8) is brought up to, and maintained at, the desired pressure by energizing compressor (10) and opening gas inlet valve (12) to allow gas from solvent reservoir (4) to flow therefrom. The extractor (2) is then heated to the desired extraction temperature using a heating device (not shown) that surrounds the extractor. When both the desired extractor temperature and the desired pressure of the system are reached, carbon dioxide is present in the extractor as a supercritical fluid and the extraction process is started by opening pressure reduction valve (22). The supercritical carbon dioxide flows through the supercritical fluid extraction system (8) at a desired flow rate. The defatted soy product remains in the extractor (2) while the lipids and water being extracted are collected in the separator (6), which is at ambient temperature and pressure. The exact setup of the supercritical fluid extraction system used in the present invention is not critical and any supercritical fluid extraction system known by one skilled in the art can be used for the first extraction of the current invention. Other components that may be present in the system include, for example, pressure gauge (14), heat exchanger (16), pressure gauge (18), flow meter (20), and dry test meter (24).

To achieve the desired results from the first extraction, the pressure in the extractor (2) is greater than about 1,095 psi (about 75.8 bar) to maintain the $CO_2$ in a supercritical condition. The maximum pressure obtained and maintained in the extractor (2) is about 10,000 psi (about 689.5 bar), which is the result of constraints due to equipment and cost. Preferably, the pressure maintained in the extractor, and hence the supercritical fluid extraction system, is from about 3,000 psi (about 206.9 bar) to about 6,000 psi (about 413.7 bar), and more preferably is about 5,000 psi (about 379.2 bar).

To achieve a suitable solubility of lipids within the supercritical $CO_2$ during the first extraction, the temperature in the extractor is suitably more than 31° C. and suitably no more than 70° C. Preferably, the temperature in the extractor is from about 40° C. to about 65° C., and more preferably about 60° C. Below 31° C., the solubility of lipid is poor because $CO_2$ is not in a supercritical condition. If the extractor temperature is above 80° C., the soy protein contained in the full fat soy flour is susceptible to denaturation, resulting in a damaged soy protein isolate with less desirable characteristics.

The efficiency of oil and lipid removal from the flour is influenced by the feed ratio of the supercritical $CO_2$ to full fat soy flour. As used herein, the term "feed ratio" means the weight ratio used in the extraction of supercritical carbon dioxide or mixture of supercritical carbon dioxide and organic solvent to the full fat soy flour or first extracted product as discussed below. In the extractions utilizing supercritical carbon dioxide alone, the optimal feed ratio of supercritical carbon dioxide to full fat soy flour to ensure sufficient lipid solubility in the supercritical carbon dioxide is from about 1:1 to about 100:1. Preferably, the feed ratio of supercritical carbon dioxide to full fat soy flour is about 30:1. Below a feed ratio of about 1:1, the efficiency of lipid removed from the full fat soy flour is significantly reduced. At a feed ratio above about 100:1, the costs of production begin to dramatically increase.

As noted above, the sequential extraction process of the present invention for preparing a defatted soy protein flour with minimized off-flavor comprises a second extraction step that comprises the extraction of off-flavors and off-flavor precursors from the first extraction product, which is produced using the supercritical carbon dioxide extraction described above. This second extraction step is similar to the first extraction step described above with the exception that this second extraction step utilizes a mixture of supercritical carbon dioxide and an organic solvent to remove undesirable compounds from the product produced by the first extraction. In particular, the mixture of supercritical $CO_2$ and organic solvent reduces the concentration of phospholipids that are not removed by extraction with $CO_2$ alone. Although any number of organic solvents is suitable for use in combination with supercritical carbon dioxide in this extraction, preferably the organic solvent is selected from the group consisting of 1-butanol, ethanol, isopropanol, methanol, 1-propanol, and mixtures thereof. More preferably, the organic solvent is ethanol. Ethanol is generally preferred as the organic solvent because it is easy to remove and is efficient at removing off-flavor precursors, such as phospholipids, from the first extraction product.

Although the organic solvent, such as ethanol for example, can be used as a substantially 100% pure organic solvent without any other additives such as water, it is generally suitable for the solvent to comprise up to about 20% (by weight) water. Suitably, the solvent may comprise about 10% (by weight) water, desirably about 5% (by weight) water, and more desirably about 2% (by weight) water.

In one embodiment of the present invention, the phospholipid:protein ratio is decreased from about 0.017:1 to about 0.002:1 in the second extraction step by utilizing a mixture of supercritical $CO_2$ and an organic solvent, such as ethanol. Stated another way, the second extraction decreases the phospholipids content of the flakes from about 9.9% to about 1.3%. The acid hydrolysable lipid content (or fat by acid hydrolysis as discussed below), in the second extraction step is also decreased from 5.8% to 1.6%. In addition to reducing the levels of the soy off-flavor precursors, the second extraction also reduces the concentrations of many of the off-flavor compounds themselves.

Figure 2:
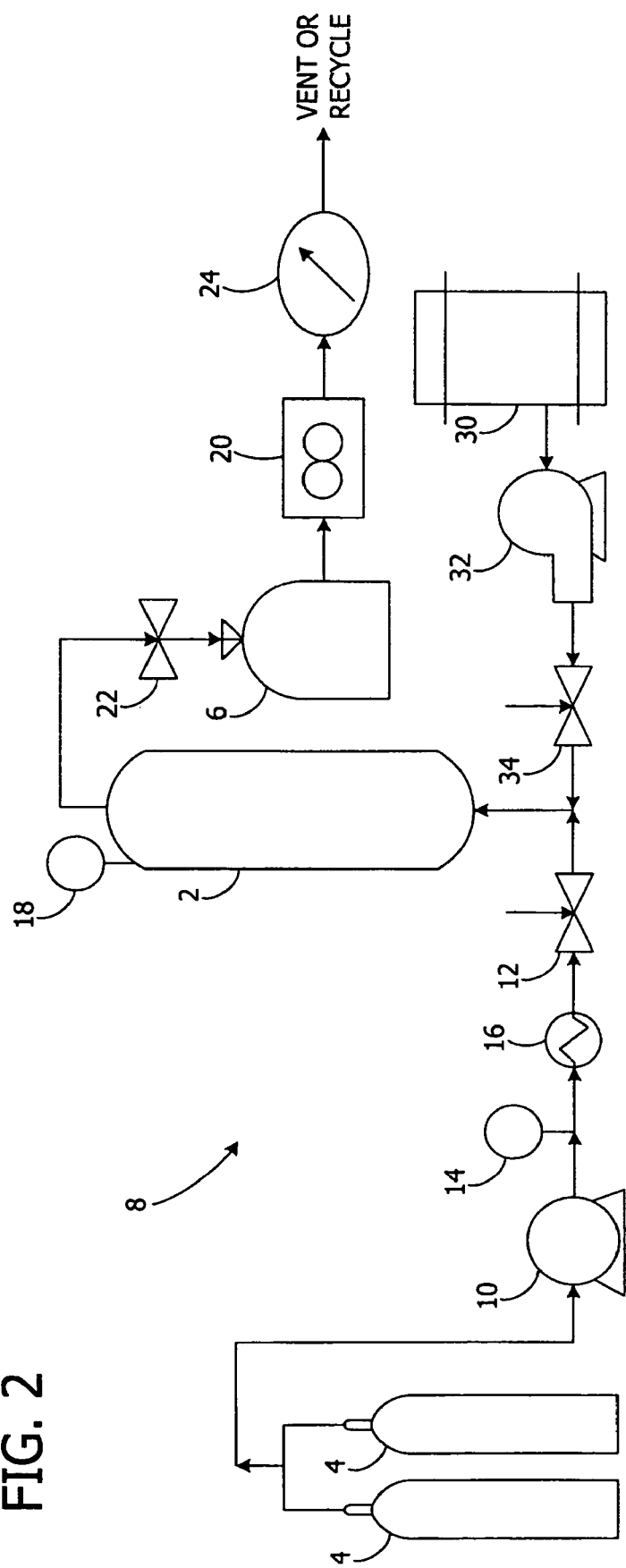
FIG. 2 is a representation of a supercritical carbon dioxide-ethanol extraction system suitable for use in the processes of the present invention.

The extraction of the first extraction product using a mixture of supercritical $CO_2$ and an organic solvent is also carried out in a supercritical fluid extraction system. However, the system used in the second extraction additionally includes an organic solvent reservoir, pump, and inlet valve to allow for the mixing of supercritical $CO_2$ and an organic solvent as the extraction fluid. As noted in FIG. 2, there is shown a supercritical fluid extraction system similar to that of FIG. 1 described above with additional components: organic solvent reservoir (30) for holding and supplying an organic solvent during extraction, pump (32) for pumping the organic solvent, and organic solvent inlet valve (34) for allowing the organic solvent to be fed into the extractor (2). The first extracted product remains in the extractor, while the off-flavors and off-flavor precursors are extracted into the separator by the combination of the supercritical $CO_2$ and organic solvent.

To achieve the desired result in the second extraction, the minimum pressure to be maintained in the extractor is about 1,095 psi (about 75.8 bar). The maximum pressure to be maintained in the extractor is about 10,000 psi (about 689.5 bar), which is the result of economic and equipment constraints. Preferably, the extractor, and hence the supercritical fluid extraction system, is at a pressure of from about 3,000 psi (about 206.9 bar) to about 6,000 psi (about 413.7 bar), and more preferably is about 5,000 psi (about 379.2 bar).

To achieve the optimal solubility of the off-flavor precursors in the supercritical $CO_2$-organic solvent mixture, the minimum temperature of the extractor in the second extraction is about 31° C. and the maximum temperature of the extractor is about 70° C. Preferably the extractor temperature is from about 40° C. to about 65° C. and more preferably is about 60° C. At extractor temperatures below 31° C., the solubility of off-flavor precursors like phospholipids is low. At extractor temperatures above 80° C., the soy protein is susceptible to denaturation.

Generally the amount of organic solvent used in combination with the supercritical $CO_2$ should be from at least about 10 wt % of the total weight of the supercritical $CO_2$-organic solvent mixture. Typically, the amount of organic solvent can be at least about 10 wt %, at least about 20 wt %, at least about 30 wt %, at least about 40 wt %, at least about 50 wt %, or even at least about 60 wt % of the total weight of the supercritical $CO_2$-organic solvent mixture. Preferably, the amount of organic solvent is from about 10 wt % to about 30 wt %, more preferably is from about 25 wt % to about 30 wt %, and most preferably is about 25 wt %. With an amount of organic solvent less than 10 wt %, the phospholipids present in the first extracted product are not effectively extracted.

The feed ratio of the supercritical $CO_2$-organic solvent mixture to first extracted product for optimal off-flavor precursor solubility is from about 1:1 to about 100:1 in the second extraction. Preferably, the feed ratio of supercritical carbon dioxide-organic solvent mixture to first extracted product is about 20:1. Below a feed ratio of 1:1, the efficiency of off-flavor precursor removal is reduced. Above a feed ratio of 100:1, the production costs increase disproportionately without significant improvement in off-flavor precursor removal.

Optionally, soy protein isolates may be prepared from the extracted defatted soy protein flour utilizing an aqueous wash extraction procedure and subsequent steps to convert the product of the second extraction, i.e., the defatted soy flake having reduced lipids, off-flavors, and off-flavor precursors, into a soy protein isolate. These steps are known to those skilled in the art and are described, for example, in J. Hettiarachchny, et al., *Soybeans: Chemistry, Technology, and Utilization*, p. 386-387, Aspen Publishers, (1997), which is incorporated herein by reference in its entirety. This optional extraction process is generally conducted by contacting the product from the second extraction with an aqueous wash solution. The aqueous wash solution can have a neutral or basic pH, i.e., a pH of at least 7.0.

In one embodiment, the aqueous wash solution has a basic pH. In this embodiment, the solution contains a set amount of base, such as sodium hydroxide, potassium hydroxide, ammonium hydroxide, and/or calcium hydroxide. The pH of the wash solution is slowly decreased as the base is neutralized by substances extracted out of the solid flakes. The initial amount of base is typically chosen so that at the end of the extraction operation the extract has a desired pH value, e.g., a pH within the range of 8.0 to 9.5, more desirably a pH about 9.0. Alternatively, the pH of the aqueous phase can be monitored (continuously or at periodic time intervals) during the extraction and base can be added as needed to maintain the pH at a desired value.

After the pH of the aqueous wash solution is adjusted to the desired level, the aqueous wash solution is centrifuged and the solid material that falls out of solution is removed. Generally the aqueous wash solution is centrifuged between about 2,000 rpm and about 5,000 rpm for a time from about 5 min to about 15 min. The solid material that falls out of solution is discarded and contains off-flavors and other undesirable compounds. The remaining supernatant comprises soy protein.

After centrifuging, the supernatant is precipitated with an acid to form a precipitated soy protein curd. Precipitation separates the remaining impurities, such as carbohydrates and fats, from the soy protein. In one embodiment, to allow for sufficient precipitation, the acid is contacted with the supernatant for a time period of about 5 minutes. Typically, an acid suitable for precipitation in the process of the present invention has a pH of from about 4.0 to about 5.0, preferably about 4.5. Suitable acids for precipitation can include, for example, hydrochloric acid, phosphoric acid, and other organic and inorganic acids.

To achieve the optimal off-flavor solubility, the pH of the supernatant during precipitation is adjusted to between about 1.0 and about 6.0. Preferably, the pH of the supernatant during precipitation is adjusted to between about 3.5 and about 5.5 and more preferably to about 4.5. If the pH of the supernatant during precipitation is below about 1.0, the soy protein curd may be damaged. If the pH of the supernatant during precipitation is above about 6.0, the soy protein curd may not sufficiently precipitate.

After sufficient precipitation, the precipitated soy protein curd is typically contacted with a hydrating solution comprising water to form a precipitated soy protein curd suspension. As used herein, the term "hydrating" refers to a static or dynamic soaking of the precipitated soy protein curd with a hydrating solution for about 5 minutes. Suitably, hydration occurs by contacting the precipitated soy protein curd with a sufficient amount of hydrating solution comprising water.

After the precipitated soy protein curd has been sufficiently hydrated, the precipitated soy protein curd suspension is contacted with a basic solution, such as sodium hydroxide (NaOH), or another suitable basic material to form a neutralized soy protein curd suspension. The neutralized soy protein curd suspension has an increased pH. Typically, the precipitated soy protein curd suspension should be contacted with enough basic solution to raise the pH of the neutralized soy protein curd suspension to a pH of about 6.5 to about 8.0, preferably about 7.0.

After the pH of the neutralized soy protein curd suspension is adjusted to the desired level, the process of the present invention further comprises heating the suspension to remove additional water. In order to remove additional water from the neutralized soy protein curd suspension, the neutralized soy protein curd suspension is heated to between about 60° C. and about 100° C. After a sufficient amount of water is removed from the neutralized soy protein curd suspension, it is cooled to a temperature between about 49° C. and about 71° C. When the neutralized soy protein curd suspension has been sufficiently cooled it is homogenized, resulting in a slurry. Generally the neutralized soy protein curd suspension is homogenized under a pressure of from about 2,500 psi (about 172.4 bar) to about 3,500 psi (about 241.3 bar). Any homogenizing equipment known in the art can be used to homogenize the neutralized soy protein curd suspension. For example, a Gaulin homogenizer can be used to homogenize the neutralized soy protein curd suspension.

The slurry of the neutralized soy protein curd suspension is dried to obtain a soy protein isolate. In one embodiment, the suspension can be dried by spray drying at a temperature of about 82° C. Any suitable spray drier known in the art may be used to dry the product. For example, a Niro Mobile Minor Spray Dryer can be used to dry the product. The resulting spray dried product is a soy protein isolate with reduced off-flavor.

In another embodiment, the process of forming defatted protein compositions with reduced off-flavor comprises a single step, and may be referred to as a simultaneous extraction. In this process, lipids, off-flavors, and off-flavor precursors are extracted from full fat protein compositions, as described above, using a mixture of supercritical $CO_2$ and an organic solvent, as described above. The extraction conditions of temperature, pressure, feed ratio, and amount of organic solvent used in combination with the supercritical carbon dioxide are as defined above. The extracted product may then optionally be converted to a soy isolate with improved flavor using the aqueous wash extraction as described herein above.

In another embodiment, the process for forming defatted soy protein flour with reduced off flavor comprises a single extraction conducted at an elevated pressure. In this process, lipids, off-flavors, and off-flavor precursors are extracted from full fat flour using supercritical carbon dioxide as described above, with the exception that the pressure utilized is greater than 10,000 psi (689.5 bar), and desirably greater than 10,150 psi (700 bar). The extraction conditions of temperature and feed ratio, are as defined above.

The processes of the present invention produce a soy protein flour with reduced off-flavor, which can easily be processed into a soy protein isolate with reduced off-flavor. As discussed above, off-flavors form from off-flavor precursors, such as free polyunsaturated fatty acids, partially oxidized unsaturated fatty acids, those polyunsaturated fatty acids present in triglycerides and phospholipids, and any polyunsaturated lipids present in the unsaponifiable fraction. AOAC Method 922.06 for acid-hydrolysable lipid quantitates all of these components. Generally, acid hydrolyzable lipids (commonly referred to as fat as measured by acid hydrolysis) present in the soy protein isolates are reduced to a level below about 1.5 wt % when the processes of the present invention are utilized. This is significantly lower than conventional hexane-defatted flour that has acid hydrolysable fat levels from about 2.8 wt % to about 5.0 wt %. While this decrease may appear to be small in absolute terms, it represents more than a 50% decrease. It must also be remembered that the taste thresholds of the off-flavor compounds are at parts per billion (ppb) and parts per trillion (ppt) levels. Thus, only parts per million (ppm) levels of the off-flavor precursors need to be present in order to allow the off-flavors to form at levels about taste threshold.

As discussed above, a soy product with a longer shelf life is desirable to consumers and manufacturers. In addition to reducing lipids and off-flavors, the two and three step processes above may increase the shelf life of the soy protein isolates. Firstly, the levels of off-flavors in the fresh product are reduced and their concentrations will have to increase that much further during storage before they become apparent to consumers. Secondly, the low levels of acid hydrolysable lipids show that the levels of off-flavor precursors present are much lower than those in conventional isolate and the rate of their decomposition to generate off-flavors will be correspondingly lower.

Additionally, the processes described herein are effective at reducing the microbiological plate count of the extracted product. The use of defatted flake having reduced microbiological plate count results in more efficient use of processing facilities and less off-flavor development as discussed above. Hexane defatted flour typically has a microbiological plate count of up to about 10,000 cfu/g., while the two and three step processes both produce defatted flake with a microbiological plate count below about 100 cfu/g. Preferably, the microbiological plate count of the defatted flake of the current invention is from about 0 cfu/g to about 50 cfu/g.

In addition to the processes for preparing soy protein compositions of soy protein flour, soy protein concentrates and soy protein isolates with reduced off-flavors, the present invention is also directed to soy protein compositions having reduced off-flavors and reduced off-flavor precursors prepared by the processes above. The soy protein compositions of the present invention have a very low lipid content, as measured by acid hydrolysis, which measures all of the lipid content of the soy protein compositions. By being very low in lipid content, the soy protein compositions are very low in lipid content, which leads to a soy protein composition with improved flavor. This is true because the lipids present in soy protein compositions, through oxidation and other mechanisms, result in the formation of volatile compounds as described herein that can lead to off-flavors in the resulting soy protein composition.

The total amount of lipid in a soy protein composition of a soy protein flour, a soy protein concentrate or soy isolate) can be measured using fat hydrolysis according to the Official Methods of Analysis of the AOAC International, 16th Edition, Method 922.06, Locator 32.1.13 (Modified). This method includes taking a 50 ml beaker containing a 2.0 g sample of the soy protein composition, adding 2 ml alcohol and stirring to moisten all particles to prevent lumping on addition of an acid. The contents of the beaker are hydrolyzed by the addition of 10 ml of dilute hydrochloric acid prepared by combining 25 g of concentrated HCl with 11 g water. The contents are mixed and the beaker is set in a water bath held at 70-80° C., and stirred at frequent intervals for 30-40 minutes. The beaker is removed from the water bath and added are 10 ml of alcohol and the contents are permitted to cool. The contents of the beaker are transferred to a Mojonnier fat extraction tube. The beaker is rinsed with 25 ml ether added in three portions and the rinse is added to the tube. The tube is stoppered and shaken vigorously for one minute. Added to the tube are 25 ml redistilled petroleum ether (bp<60° C.) and again shaken vigorously for one minute. The contents are permitted to stand until the upper liquid is practically clear or the contents are centrifuged for 20 minutes at 600 revolutions per minute. The contents of an ether-fat solution is drawn off through a filter consisting of cotton pledget packed just firmly enough in a funnel stem to let ether pass freely into a weighted 125 ml beaker containing porcelain chips. The ethers are slowly evaporated on a steam bath to produce a fat, then the fat is dried in an oven at 100° C. to a constant weight. The recovered fat is reported as a percent of the total starting protein sample.

Specifically, the present invention relates to a soy protein isolate with reduced off-flavor and reduced off-flavor precursors comprising a low level of fat, as measured by acid hydrolysis as described above. Particularly, soy protein isolates comprise less than about 1.5% (by weight dry basis) fat (by acid hydrolysis). Preferably, the soy protein isolate has less than about 1.2% (by weight dry basis) fat (by acid hydrolysis). More preferably, the soy protein isolate has less than about 1.0% (by weight dry basis) fat (by acid hydrolysis). Most preferably, the soy protein isolate has less than about 0.8% (by weight dry basis) fat (by acid hydrolysis).

The soy protein isolates of the present invention can be used in many consumer products such as soy milk, dairy-type products, bottled fruit drinks, power bars, soups, sauces, meat analogs, breads, baked goods, and breakfast cereals. In particular, the soy protein isolate of the current invention is suitable for soy milk. Since the soy protein isolate of the current invention has reduced amounts of off-flavors, the taste of the above food products will not have the grassy, beany, and bitter off-flavor taste of traditional soy protein isolates while still providing the quality protein of a soy protein isolate.

Additionally, the soy protein isolates of the present invention can be used in combination with other proteins to produce soy protein products having a reduced amount of off-flavor. In particular, the soy protein isolate of the current invention can be used with dairy milk proteins to produce a soy product composition having a reduced amount of off-flavor. Suitable dairy milk proteins are defined above.

The processes described herein for producing soy flour produce a soy flour with significantly reduced amounts of lipid therein. In one embodiment, the soy flour comprises less than about 3% (by weight dry basis) fat (by acid hydrolysis), and suitably less than about 2.5% (by weight dry basis) fat (by acid hydrolysis). The analytical procedure for measuring fat by acid hydrolysis it set forth above herein.

Additionally, the processes described herein for producing soy flour produce a soy flour with significantly reduced amount of lipid therein as measured by petroleum ether extraction (sometimes referred to as crude fat).

The total amount of crude fat in a soy protein composition of a soy protein flour, a soy protein concentrate or soy isolate) can be measured using a crude fat procedure according to the Official Methods of Analysis of the AOAC International, 16th Edition, Method 920.39C, Locator #4.5.01 (Modified). The petroleum ether is prepared by washing commercial petroleum ether with two or three portions of water, followed by the addition of solid sodium hydroxide or potassium hydroxide. The petroleum ether is permitted to stand until most of the water is abstracted from the petroleum ether. The petroleum ether is decanted into dry bottle and small pieces of carefully cleaned metallic sodium is added and the petroleum ether is permitted to stand until hydrogen evolution ceases. The dehydrated petroleum ether is stored over metallic sodium in a loosely stopper bottle.

A 2.0 g sample of soy protein is extracted with five 20 ml portions of water. The soy protein is dried and put into a thimble with porosity permitting rapid passage of petroleum ether. The petroleum ether is added to the thimble contents at a rate of 5-6 drops per second for 4 hours up to 2-3 drops per second for 16 hours. The petroleum ether extract is dried to recover the crude fat which is reported as a percent of the total starting protein sample.

In one embodiment, the soy flour comprises less than about 0.7% fat (by petroleum ether extraction), and suitably less than 0.65% fat (by petroleum ether extraction). The analytical procedure for measuring fat by petroleum ether extraction is set forth herein.

The following examples are simply intended to further illustrate and explain the present invention. The invention, therefore, should not be limited to any of the details in these examples.

EXAMPLE 1

In this example, full fat soy flour is subjected to a three-step extraction process to produce soy protein isolates with minimized off-flavors and off-flavor precursors.

Full fat soy flour (100 mesh full fat soy flour) is obtained from Natural Products Inc., Grinell, Iowa. Prior to any extraction, the full fat soy flour is determined to have 23.3 wt % acid hydrolyzable lipids present on a dry basis. The full fat soy flour (3.58 kg) is loaded into a 10 L extraction chamber of a supercritical fluid extraction system similar to that set forth in FIG. 2. The extraction chamber is heated to a temperature of 60° C. and maintained. Carbon dioxide ($CO_2$) is then fed into the suction side of the compressor of the system and the system is compressed to 5,000 psi. The inlet valve and the pressure reduction valve are opened and a $CO_2$ flow rate of 160 g/min is established. The extraction process is continued for 11 h, at which time it is determined that nearly all lipids are extracted from the full fat soy flour. A total of 105.6 kg of $CO_2$ will pass through the full fat soy flour (29.5:1 solvent feed ratio) when the system is shut down.

After determining that substantially all the lipids are extracted from the full fat soy flour, an ethanol pump is energized and ethanol is pumped into the supercritical extraction system as a solvent in combination with the $CO_2$. Ethanol (containing 2% added water) is pumped in at 25 wt % of the total weight of the mixture of supercritical $CO_2$ and ethanol. The $CO_2$ and ethanol pumping rates are maintained at 90 g/min, and 30 gm/min respectively. The pressure of the system is reduced to 4,000 psi and the temperature of the extraction chamber is maintained at 60° C. After 54 kg of $CO_2$ passes through the first extracted product (20:1 solvent:feed ratio) the system is shut down. A total of 2.44 kg of second extracted product is obtained from the extraction chamber. The second extracted product of defatted soy protein flour contains 1.3 wt % acid hydrolyzable lipids.

The second extracted product recovered from the extraction chamber is subjected to an aqueous wash extraction where it is converted into soy protein isolate product with reduced off-flavor and reduced off-flavor precursors.

A portion of the second extracted product (450.0 g) is added to 4.5 L of water in a 10 L beaker. Sodium sulfite, 0.81 g, is then added to the solution in the 10 L beaker to form an aqueous wash solution. The pH of the aqueous solution is adjusted to a pH of 9.01 by adding 95.38 g of 1 N sodium hydroxide. The aqueous wash solution is then mixed for 15 min. The aqueous wash solution is then centrifuged for 10 min at 3,500 rpm. After the centrifugation, the solid material is removed from the beaker and discarded, leaving a supernatant comprising the soy protein.

The pH of the supernatant is precipitated at a pH of 4.50 by adding 214.55 g of 1 N hydrochloric acid and mixing for 15 min. The supernatant solution is then centrifuged for 10 min at 3,500 rpm. The solid that precipitates out of solution comprises a precipitated soy protein curd. The precipitated soy protein curd is then removed and diluted down with 1.8 L of water and mixed again for 15 min to form a precipitated soy protein curd suspension. After mixing, the precipitated soy protein curd suspension is centrifuged a final time for 10 min at 3,500 rpm and the solid is removed and diluted with 2 L of water and stored for 12 h in a cooler at 39° C.

The precipitated soy protein curd suspension is then further diluted with 3.26 L of water. The curd suspension is then heated in a steam kettle to 32.2° C. Then the pH of the heated solution is adjusted to a pH of 7.01 by adding 333.51 g of 1 N sodium hydroxide. After a pH of 7.01 is reached the suspension is heated to 82.2° C. and held there for 3 min. The curd suspension is then cooled to 60° C. and homogenized at 3,000 psi using a Gaulin homogenizer. The slurry of curd suspension is then spray dried using a Niro Mobile Minor Spray Dryer at a rate of 16 mL/min with an inlet temperature of 165° C. and an outlet temperature of 70° C. A total of 377.38 g of soy protein isolate product is collected and is determined to contain 0.8 wt % acid hydrolyzable lipid.

EXAMPLE 2

In this example, the soy protein isolate product with reduced off-flavors made in Example 1 by the three step extraction process is converted to a soymilk with reduced off-flavors. The hedonic acceptance score of the improved soymilk is then compared with that of a control soymilk, which is prepared from standard, commercial grade, hexane-defatted flake.

The taste test is conducted according to a nine-point hedonic acceptance panel as described in Sensory Evaluation Manual 26 Sensory Testing Methods, Second Edition, Edgar Chambers IV and Mona Baker Wolf (1996). Fifty Solae employees between the ages 35 and 55 evaluate the samples.

The panel evaluates three samples. The first sample is prepared with the soy protein isolate with reduced off-flavor as prepared above. The first sample uses the soy protein isolate to prepare a caramel-flavored soymilk by a standard industry process. The process comprises adding 4,682.52 g of water into a 12 kg kettle. Then 217.20 g of the soy protein isolate prepared above in Example 1 is added. The kettle is heated up to 80° C. and that temperature is maintained for 10 min. Then 174.0 g of sugar, 120.0 g of corn syrup, 240.0 g of maltodextrin, and 300.0 g of lactose, are blended together and added to the 12 kg kettle and mixed for 5 min. Then 150.00 g of sunflower oil, 3.60 g of salt, 12.00 g of vanilla flavor, 0.60 g of carageenen, 1.08 g of caramel color, and 99.0 g of yellow solution are added into the 12 kg kettle and mixed for 3 min. The solution is then heated up to 80° C. again and held for 1 min. The mixture is homogenized in a Gaulin homogenizer first at 2,500 psi and then second at 500 psi. The homogenized mixture is poured into 500-mL sterile bottles and immediately cooled in an ice bath.

The second sample consists of a control soymilk prepared with standard isolate, which is prepared as described in Example 1. The flake used is standard, commercial grade hexane-defatted white flake. The soymilk is prepared from the isolate as described above. The amounts of all ingredients remain the same except that the amount of soy isolate and water changes slightly to 234.15 g and 4,665.57 g respectively. The other ingredients change proportionately.

The third sample is a dairy milk-based beverage with equivalent protein content to the soymilks above. The dairy milk sample is prepared with 2% dairy milk purchased from a local supermarket. To prepare the sample 6,000.0 g of 2% dairy milk is added to a 12 kg kettle. Then 210.0 g of sugar, 120.0 g of corn syrup, and 240.0 g of maltodextrin are added to the kettle. The mixture in the kettle is mixed for 5 min. Then 1.80 g of carageenen, 12.0 g of vanilla flavor, 2.28 g of caramel color, and 118.68 g of yellow solution are added and the mixture is heated to 80° C. and held there for 1 min. The mixture is then homogenized with a Gaulin homogenizer first at 2,500 psi and then second at 500 psi. The mixture is poured into 500-mL sterile bottles and immediately cooled down in an ice bath.

The company employees test a 3 ounce sample of each milk sample prepared above and evaluate it based on three criteria: 1) liking of flavor, 2) liking of mouthfeel, and 3) overall liking.

The taste test results can be seen in Table 1 below. The first sample comprising the current invention scores one full hedonic point higher than the control soy isolate of sample two in liking of flavor and overall liking. The first sample comprising the current invention has equivalent scores in liking of flavor and overall liking to the commercial 2% dairy milk. Therefore, the current invention shows superior consumer acceptance compared to traditional soy isolate.

TABLE 1

| Protein source for flavored milk | Liking of Flavor | Liking of Mouthfeel | Overall Liking |
|---|---|---|---|
| Invention Soy Isolate | 6.28[a] | 5.92[b] | 5.96[a] |
| Control Soy Isolate | 5.22[b] | 5.82[b] | 5.12[b] |
| Commercial 2% Dairy Milk | 6.42[a] | 6.46[a] | 6.02[a] |

The superscripts (a) and (b) within a column indicate a significant statistical difference at a 95% confidence level.

In Example 3, defatted soy protein flour, for use as a starting material for producing soy protein isolates or soy protein concentrates, is produced according to a process of the present invention and analyzed to determine various properties of the defatted soy flake.

EXAMPLE 3

About 300 g of full fat soy flakes having a protein content of 45.02% on a moisture free basis and a fat content of 21.57% (by acid hydrolysis) on a moisture free basis are loaded into a 4 L extraction chamber of a supercritical fluid extraction system. The extraction chamber is heated to a temperature of 60° C. and maintained. Carbon dioxide ($CO_2$) without any co-solvent is used for the extraction. Total $CO_2$ used for extraction is 13,500 g. The extraction is carried out at 700 bar pressure for 803 minutes. At the end of the extraction process, the defatted flakes are recovered from the extraction chamber. The recovered defatted flakes are analyzed to determine the content thereof. The results of the analysis are shown in Table 2. All results are on a moisture-free basis, unless otherwise stated.

TABLE 2

Composition of Product of Example 3

| Composition or Element Determined | Amount Determined in Soy Flake |
|---|---|
| Protein (wt. % dry basis) | 56.65 |
| Crude Fat (wt. % dry basis) | 0.34 |
| Fat by Acid Hydrolysis (wt. % dry basis) | 2.50 |

EXAMPLE 4

The process of Example 3 is repeated with the exception that the solvent for extraction is a combination of 12,150 g $CO_2$ and 1350 g absolute ethanol and the total extraction time is 970 minutes. The recovered defatted flakes are analyzed to determine the content thereof. The results of the analysis are shown in Table 3. All results are on moisture-free basis, unless otherwise stated.

TABLE 3

Composition of Product of Example 4

| Composition or Element Determined | Amount Determined in Soy Flake |
|---|---|
| Protein (wt. % dry basis) | 57.87 |
| Crude Fat (wt. % dry basis) | <0.1 |
| Fat by Acid Hydrolysis (wt. % dry basis) | 2.44 |

EXAMPLE 5

About 400 g of full fat soy flakes having a protein content of 45.02% on a moisture free basis and a fat content of 21.57% (by acid hydrolysis) on a moisture free basis are loaded into a 4 L extraction chamber of a supercritical fluid extraction system. The extraction chamber is heated to a temperature of 60° C. and maintained. The solvent for extraction is a combination of 16,200 g ($CO_2$) and 1800 g absolute ethanol. The extraction is carried out at 300 bar pressure for 120 minutes. The results of the analysis are shown in Table 4. All results are on moisture-free basis, unless otherwise stated.

TABLE 4

Composition of Product of Example 5

| Composition or Element Determined | Amount Determined in Soy Flake |
|---|---|
| Protein (wt. % dry basis) | 57.20 |
| Crude Fat (wt. % dry basis) | 0.60 |
| Fat by Acid Hydrolysis (wt. % dry basis) | 2.33 |

EXAMPLE 6

The process of Example 5 is repeated with the exception that the solvent for extraction is a combination of 15,300 g carbon dioxide and 2700 g absolute ethanol. The recovered defatted flakes are analyzed to determine the content thereof. The results of the analysis are shown in Table 5. All results are on moisture-free basis, unless otherwise stated.

TABLE 5

Composition of Product of Example 6

| Composition or Element Determined | Amount Determined in Soy Flake |
|---|---|
| Protein (wt. % dry basis) | 57.85 |
| Crude Fat (wt. % dry basis) | 0.61 |
| Fat by Acid Hydrolysis (wt. % dry basis) | 2.15 |

EXAMPLE 7

The process of Example 5 is repeated with the exception that the solvent for extraction is a combination of 14,400 g carbon dioxide and 3600 g absolute ethanol. The recovered defatted flakes are analyzed to determine the content thereof. The results of the analysis are shown in Table 6. All results are on moisture-free basis, unless otherwise stated.

TABLE 6

Composition of Product of Example 7

| Composition or Element Determined | Amount Determined in Soy Flake |
|---|---|
| Protein (wt. % dry basis) | 57.58 |
| Crude Fat (wt. % dry basis) | 0.56 |
| Fat by Acid Hydrolysis (wt. % dry basis) | 2.31 |

COMPARATIVE EXAMPLE 1

In this Comparative Example, the various properties of commercially available defatted soy flakes are determined to allow comparison with the defatted soy flakes produced in Examples 3-7 above.

Commercially available defatted flakes or flour samples are analyzed to determine the protein and fat content. The results of the analyses, along with the number of samples analyzed, are shown in Table 7. All results are on a moisture-free basis, unless other stated.

TABLE 7

Composition of Product of Comparative Example 1

| Composition | No. of Samples Analyzed | Average | Min. | Max. |
|---|---|---|---|---|
| Protein (mfb, wt %) | 8 | 55.11 | 54.56 | 55.69 |
| Crude Fat (wt %) | 8 | 1.04 | 0.81 | 1.56 |
| Fat by Acid Hydrolysis (wt %) | 3 | 3.15 | 3.06 | 3.22 |

While the invention has been explained in relation to its preferred embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. A process for preparing a soy protein composition comprising performing an extraction on a full fat soy protein flour with a mixture of supercritical carbon dioxide and an organic solvent to produce an extracted defatted soy protein flour, wherein the organic solvent is selected from the group consisting of 1-butanol, ethanol, isopropanol, methanol, 1-propanol, and mixtures thereof, combining the extracted defatted soy protein flour with water to form an aqueous wash solution having a pH of at least 7.0, removing solid material from the aqueous wash solution to form a supernatant, adjusting the pH of the supernatant to between about 1.0 and about 6.0 with an acid to precipitate soy protein curd, contacting the precipitated soy protein curd with a hydrating solution to form a precipitated soy protein curd suspension, contacting the precipitated soy protein curd suspension with a basic solution to raise the pH to about 6.5 to about 8.0 to form a neutralized soy protein curd suspension, and drying the neutralized soy protein curd suspension to form a defatted soy protein isolate that contains 90% or greater (by dry weight) soy protein, wherein the soy protein composition comprises less than about 0.8% (by weight dry basis) fat (by acid hydrolysis).

2. The process as set forth in claim 1 wherein the extraction is performed in an extraction chamber at a pressure of from about 1,095 pounds per square inch to about 10,000 pounds per square inch.

3. The process as set forth in claim 1 wherein the extraction is conducted at a temperature of from about 31° C. to about 70° C.

4. The process as set forth in claim 1 wherein the extraction on full fat soy flour has a feed ratio of supercritical carbon dioxide-organic solvent mixture to full fat soy flour on a weight basis of from about 1:1 to about 100:1.

5. The process as set forth in claim 1 wherein the organic solvent is present in the mixture utilized in the extraction on full fat soy flour at a level of from about 10 wt. % to about 30 wt. %.

6. The process as set forth in claim 1 wherein a soymilk containing 3.62% of the soy protein composition has at least a 5.92 on flavor and mouthfeel on a nine point hedonic scale.

* * * * *

UNITED STATES PATENT AND TRADEMARK OFFICE
CERTIFICATE OF CORRECTION

PATENT NO. : 7,638,155 B2 Page 1 of 1
APPLICATION NO. : 11/159547
DATED : December 29, 2009
INVENTOR(S) : Irwin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 466 days.

Signed and Sealed this

Ninth Day of November, 2010

David J. Kappos
*Director of the United States Patent and Trademark Office*